No. 648,967. Patented May 8, 1900.
L. M. LITTLEFIELD.
CORN AND PEA PLANTER.
(Application filed July 15, 1899.)
(No Model.)
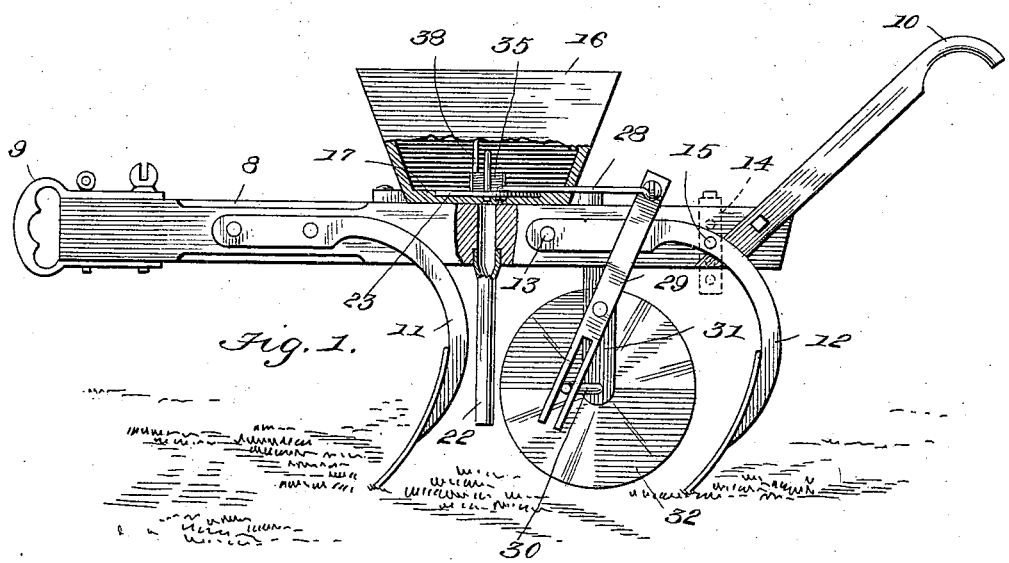
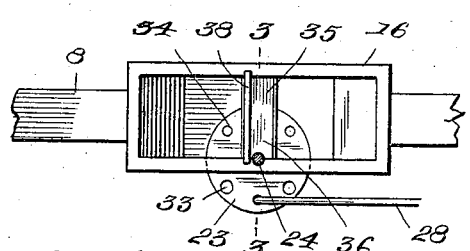
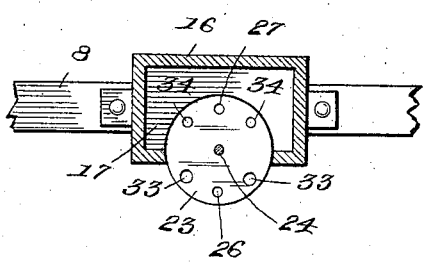
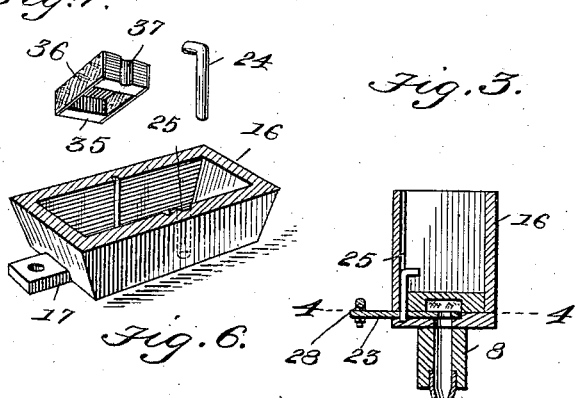
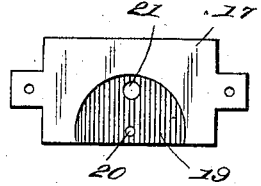
Witnesses
Inventor
L. M. Littlefield,
Attorney

UNITED STATES PATENT OFFICE.

LANDON M. LITTLEFIELD, OF ADAIRSVILLE, GEORGIA.

CORN AND PEA PLANTER.

SPECIFICATION forming part of Letters Patent No. 648,967, dated May 8, 1900.

Application filed July 15, 1899. Serial No. 723,920. (No model.)

*To all whom it may concern:*

Be it known that I, LANDON M. LITTLEFIELD, a citizen of the United States, residing at Adairsville, in the county of Bartow and State of Georgia, have invented a new and useful Corn and Pea Planter, of which the following is a specification.

My invention relates to the general class of corn-planters, but more particularly to the feed-operating mechanism for the hopper.

One object of my invention is to provide a partitioned or divided hopper whereby the two kinds of grain or seed can be fed through a common feed-tube without danger of becoming mixed.

Another object is to provide means for regulating the feed, so that a greater or lesser amount of grain can be fed into the furrow.

With these objects in view my invention consists of a divided hopper having a rabbeted bottom, in which is pivoted a disk, and a transverse bearing-block having flexible sides and held in said hopper by the pivot on which the disk is secured.

My invention further consists in the parts and combination of parts, as will be more fully set forth in the accompanying specification, illustrated in the drawings, and recited in the claims hereunto annexed.

In the drawings, Figure 1 is a side elevation of a walking corn-planter, showing the hopper partly in section to illustrate the interior thereof. Fig. 2 is a top plan view of the hopper. Fig. 3 is a vertical section on the line 3 3 of Fig. 2. Fig. 4 is a transverse section on the line 4 4 of Fig. 3. Fig. 5 is a top plan view of the rabbeted bottom plate of the hopper. Fig. 6 is a perspective sectional view of the hopper, illustrating the elongated groove in which the disk pivot-pin is positioned; and Fig. 7 is a fragmentary detail perspective of the bearing-block and securing means.

Referring to the drawings by numerals, 8 designates the planter-beam, having the usual clevis 9 and handles 10. To the forward part of this beam is secured the furrow-opener 11, and rearwardly of the beam are the coverers 12. These coverers 12 are pivotally secured to the beam at 13 and by means of the yoke-shaped adjustable brace 14 and the removable pin 15 can be raised or lowered to suit the operator. On the top of the beam, intermediate its ends and immediately behind the furrow-opener, I secure a hopper 16, provided with a metallic bottom plate 17, secured to the beam and cut away or countersunk to form a rabbet 19, substantially semicircular in shape and having a perforation 20, in which the disk-pivot is secured, and a seed-opening 21, communicating with the downwardly-projecting tube 22, positioned immediately beneath said opening.

23 is a feed-disk pivoted in the rabbeted portion of the bottom plate by a pin 24, which extends upwardly a short distance in the groove 25 of the hopper. This disk is provided with perforations 26 and 27, which are adapted to be engaged by the pitman 28, connected to the pivoted lever 29, bifurcated at its lower end and engaged by the crank-arm 30 of the axle, journaled in the standards 31 and carrying the presser-wheel 32, whereby the disk is oscillated. It will be noticed that this disk 23 is provided with seed-openings 33 and 34, the first-named openings being somewhat larger than the other ones, and by this construction a large or small amount of seed can be fed from the hopper, as is desired.

As most clearly illustrated in Fig. 7, 35 is a bearing-block substantially rectangular in shape and having flexible sides 36, composed of leather or any fibrous material. 37 is a groove in the block, at one end, and is designed to register with the pivot-pin of the disk 23, whereby it will be held on top of said disk and locked against any lateral displacement. An upward displacement of the block is prevented by means of the partition 38, which divides the hopper and bears on the top thereof.

The operation of my invention is as follows: Suppose it is desired to plant peas and corn. The peas are placed in one side of the hopper and the corn in the other side, the planter is started, and the rotation of the wheel will impart a slight rocking motion to the pivoted lever, which in turn will actuate the pitman, and thereby oscillate the disk, feeding corn from one side and peas from the other alternately into the tube 22, from where they will be dropped into the furrow opened by the opener 11, and the wheel 31 will press the seed into the ground and they will be covered by the coverers 12.

Should it be found desirable to increase the feed of the seed, the pitman will be detached from the feed-disk and the same reversed, which will bring the larger openings 33 in register with the tube 20, which effect the result it is desired to attain.

By reason of the bearing-block bearing upon the feed-disk the flexible sides thereof will bear on said disks and allow the seed from either side of the hopper to pass thereunder to the tube; but the seed from one side will effectually be prevented from getting into the remaining side.

From the foregoing it will readily be seen that I have provided means whereby an ordinary walking-planter can be converted into a compound planter.

While I have described and illustrated what to me appears to be the best method of securing the result it is desired to attain, I would have it understood that I reserve the right to make such slight changes and alterations as would properly come within the scope of my invention without departing from the spirit thereof.

Having thus fully described my invention, what I claim as new, and desire to secure by Letters Patent of the United States, is—

1. In a planter, the combination with a hopper, having a central division and a central opening communicating with a downwardly-projecting feed-tube, of a feed-disk pivoted in the bottom of said hopper, said disk being provided with two series of openings each series being of different diameter, and means for throwing only one opening of a series into operative engagement with the feed-tube at a time, substantially as described.

2. In a planter, the combination with a divided hopper, provided with a central opening communicating with a seed-tube of a vibrating seed-disk pivoted in the bottom of said hopper, of a flexible-sided bearing-block, positioned above said disk and engaging the pivot-pin thereof, whereby said block is held against lateral displacement, and means for actuating the disks, substantially as described.

3. In a planter, the combination with a hopper having a central opening, of a reversible disk pivoted to one side of said opening, said disk having diametrically-opposite openings near its periphery of different diameter, arranged so that only one set of the openings can communicate with the central opening at a time, substantially as described.

LANDON M. LITTLEFIELD.

Witnesses:
ROBT. L. MCCALLUM,
W. S. BRADLEY.